(12) United States Patent
Park et al.

(10) Patent No.: US 9,484,561 B2
(45) Date of Patent: *Nov. 1, 2016

(54) PRISMATIC BATTERY PACK WITH NOVEL STRUCTURE

(71) Applicant: LG CHEM, LTD., Seoul (KR)

(72) Inventors: Geon Tae Park, Yeonje-gu (KR); SooRyoung Kim, Cheongwon-gun (KR); Hee Gyu Kim, Cheongwon-gun (KR); Jung Hwan Kim, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 221 days.

This patent is subject to a terminal disclaimer.

(21) Appl. No.: 14/294,400

(22) Filed: Jun. 3, 2014

(65) Prior Publication Data

US 2014/0272476 A1    Sep. 18, 2014

Related U.S. Application Data

(63) Continuation of application No. PCT/KR2013/000292, filed on Jan. 15, 2013.

(30) Foreign Application Priority Data

Feb. 7, 2012   (KR) .................. 10-2012-0012094

(51) Int. Cl.
*H01M 2/34*   (2006.01)
*H01M 2/10*   (2006.01)
(Continued)

(52) U.S. Cl.
CPC ......... *H01M 2/1022* (2013.01); *H01M 2/0217* (2013.01); *H01M 2/0267* (2013.01);
(Continued)

(58) Field of Classification Search
CPC ........... H01M 2/1022; H01M 2/0217; H01M 2/0267; H01M 2/1061; H01M 2/34; H01M 2/348; H01M 10/4257
See application file for complete search history.

(56) References Cited

U.S. PATENT DOCUMENTS

2007/0054180 A1*  3/2007  Miyajima .......... H01M 2/021
                                                      429/96
2007/0224501 A1    9/2007  Yoon
(Continued)

FOREIGN PATENT DOCUMENTS

CN      101047231 A    10/2007
CN      102017224 A    4/2011
(Continued)

OTHER PUBLICATIONS

Machine translation of JP 2003168400 A.*

*Primary Examiner* — Jonathan Jelsma
(74) *Attorney, Agent, or Firm* — Birch, Stewart, Kolasch & Birch, LLP

(57) ABSTRACT

Disclosed herein is a prismatic battery pack including an electrode assembly of a cathode/separator/anode structure impregnated with an electrolyte, a prismatic container, in which the electrode assembly is mounted, the prismatic container having at least one depressed groove formed at a bottom thereof in a longitudinal direction of the prismatic battery pack, a cap plate coupled to an open upper end of the prismatic container, in which the electrode assembly is mounted, a protection circuit module (PCM) including a protection circuit to control operation of the prismatic battery pack, the PCM being loaded on the cap plate, and an insulative cap mounted to the prismatic container while surrounding the PCM.

15 Claims, 5 Drawing Sheets

(51) Int. Cl.
*H01M 2/02* (2006.01)
*H01M 10/42* (2006.01)
*H01M 2/04* (2006.01)

(52) U.S. Cl.
CPC ............ *H01M 2/1061* (2013.01); *H01M 2/34* (2013.01); *H01M 2/348* (2013.01); *H01M 10/4257* (2013.01); *H01M 2/0473* (2013.01); *H01M 2200/106* (2013.01)

(56) References Cited

U.S. PATENT DOCUMENTS

| | | | | |
|---|---|---|---|---|
| 2009/0142660 A1* | 6/2009 | Hori | .................... | H01M 2/0421 429/174 |
| 2009/0269654 A1 | 10/2009 | Kairawicz et al. | | |
| 2011/0020672 A1 | 1/2011 | Baek et al. | | |
| 2011/0086243 A1 | 4/2011 | Bae et al. | | |
| 2012/0021256 A1 | 1/2012 | Jang | | |
| 2014/0050970 A1 | 2/2014 | Li | | |

FOREIGN PATENT DOCUMENTS

| | | | |
|---|---|---|---|
| CN | 102263298 A | | 11/2011 |
| JP | 2001-291576 A | | 10/2001 |
| JP | 2003168400 A | * | 6/2003 |
| KR | 10-2006-0059696 A | | 6/2006 |
| KR | 10-2007-0088895 A | | 8/2007 |
| KR | 10-2007-0096652 A | | 10/2007 |
| KR | 10-2011-0040670 A | | 4/2011 |
| KR | 10-2012-0010565 A | | 2/2012 |

* cited by examiner

PRISMATIC BATTERY PACK WITH NOVEL STRUCTURE

CROSS REFERENCE TO RELATED APPLICATIONS

This non-provisional application is a Continuation of International Application No. PCT/KR2013/000292 filed on Jan. 15, 2013, which claims priority to Korean Patent Application No. 10-2012-0012094 filed in Korea on Feb. 7, 2012. The entire contents of all of the above applications are hereby incorporated by reference.

TECHNICAL FIELD

The present invention relates to a prismatic battery pack with a novel structure, and, more particularly, to a prismatic battery pack including an electrode assembly of a cathode/separator/anode structure impregnated with an electrolyte, a prismatic container, in which the electrode assembly is mounted, the prismatic container having at least one depressed groove formed at a bottom thereof in a longitudinal direction of the prismatic battery pack, a cap plate coupled to an open upper end of the prismatic container, in which the electrode assembly is mounted, a protection circuit module (PCM) including a protection circuit to control operation of the prismatic battery pack, the PCM being loaded on the cap plate, and an insulative cap mounted to the prismatic container while surrounding the PCM.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as various kinds of mobile devices.

Depending upon kinds of external devices in which the lithium secondary battery is used, the lithium secondary battery may be configured to have a detachable type structure in which the lithium secondary battery can be easily inserted into and removed from the external devices or to have an embedded type structure in which the lithium secondary battery is embedded in the external devices. For example, the lithium secondary battery can be inserted or removed into or from an external device, such as a tablet personal computer (PC) or a laptop computer as necessary. On the other hand, another external device, such as a smart phone or a smart pad, requires an embedded type battery pack due to the structure or capacity thereof.

Also, the above devices require a lithium secondary battery having a large capacity based on functions and characteristics thereof.

However, the capacity of the lithium secondary battery is limited as compared with the functions and characteristics of the devices.

Of course, the capacity of the lithium secondary battery may be increased in order to overcome limitations in capacity of the lithium secondary battery. If the thickness of the lithium secondary battery is increased, however, it may be difficult to apply the lithium secondary battery to the above devices, each of which has an advantage of mobility.

Alternatively, an auxiliary secondary battery exhibiting high performance may be used to overcome limitations in capacity of the lithium secondary battery. In this case, however, it is necessary to carry the auxiliary secondary battery together with the above devices. For this reason, this method is not effective to overcome limitations in capacity of the lithium secondary battery.

Meanwhile, there has been developed a means to overcome limitations in capacity of the lithium secondary battery using an environmentally friendly method.

For example, a solar charging type mobile phone has been developed. The solar charging type mobile phone is configured such that a solar light panel is provided at a liquid crystal part to continuously charge the solar charging type mobile phone without an additional charging device or a plug receptacle. However, the solar charging type mobile phone requires light having higher than predetermined luminous intensity. Also, charging time is very long. For these reasons, this method is not effective to overcome limitations in capacity of the lithium secondary battery.

As another example, a wind power type charging device has been developed. However, the wind power type charging device requires wind exceeding a predetermined velocity. Also, it is necessary to carry the wind power type charging device together with the above devices. For these reasons, this method is not effective to overcome limitations in capacity of the lithium secondary battery.

Therefore, there is a high necessity for a technology capable of increasing the capacity of the lithium secondary battery without the use of an additional auxiliary device and without the increase in volume of the existing battery pack.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have developed a prismatic battery pack with a novel structure including an electrode assembly, a prismatic container having a depressed groove, a cap plate, and a protection circuit module (PCM), and found that, when such a prismatic battery pack is used to manufacture a lithium secondary battery, it is possible to easily achieve coupling and decoupling of the battery pack and, in addition, to maximize the size of the electrode assembly in a battery pack having a predetermined size, thereby increasing the capacity of the battery pack. The present invention has been completed based on these findings.

Technical Solution

In accordance with one aspect of the present invention, the above and other objects can be accomplished by the provision of a prismatic battery pack including an electrode assembly of a cathode/separator/anode structure impregnated with an electrolyte, a prismatic container, in which the electrode assembly is mounted, the prismatic container having at least one depressed groove formed at a bottom thereof in a longitudinal direction of the prismatic battery pack, a cap plate coupled to an open upper end of the prismatic container, in which the electrode assembly is mounted, a protection circuit module (PCM) including a protection circuit to control operation of the prismatic battery pack, the PCM being loaded on the cap plate, and an insulative cap mounted to the prismatic container while surrounding the PCM.

That is, in the prismatic battery pack according to the present invention, a bottom cap and a double-sided tape of a conventional prismatic battery pack are replaced by the at least one depressed groove, and therefore, the volume of the electrode assembly is increased by the thickness in a battery pack having a predetermined size. As a result, it is possible to increase the capacity of the battery pack. Also, the battery pack is easily coupled or decoupled to or from a device by the provision of the at least one depressed groove, thereby improving manufacturing efficiency of the device.

The prismatic container, in which the electrode assembly is mounted, may be made of various materials. For example, the prismatic container may be made of aluminum or an aluminum alloy.

Also, the prismatic container may be formed by drawing.

The drawing may be any one selected from a group consisting of deep drawing, square shell drawing, reverse redrawing, asymmetric drawing, expanding forming drawing, restriking drawing, necking drawing, expanding drawing, flaring drawing, and bell mouth drawing.

The at least one depressed groove may be formed by forging or milling. However, the present invention is not limited thereto.

The depth of the at least one depressed groove may be set based on various factors, such as the specifications of a device to which the battery pack is applied and the material for the prismatic container. For example, the at least one depressed groove may have a depth of 0.05 mm to 1.00 mm, preferably 0.1 mm to 0.5 mm.

The width of the at least one depressed groove may also be set based on various factors. For example, the at least one depressed groove may have a width equivalent to 10% to 50%, preferably 20% to 25%, a width (thickness) of the prismatic battery pack.

If the depth or the width of the at least one depressed groove is too small, it may be difficult to obtain an effect based on the formation of the at least one depressed groove. On the other hand, if the depth or the width of the at least one depressed groove is too large, the at least one depressed groove may be defective during forming of the at least one depressed groove, and it may be difficult to increase the capacity of the battery pack. For this reason, the depth or the width of the at least one depressed groove is appropriately set within the above-defined ranges.

The number of the at least one depressed groove is not particularly restricted. For example, the at least one depressed groove may include one continuous groove or two parallel depressed grooves formed at the bottom of the prismatic container.

In the above structure, the at least one depressed groove may have a length equivalent to 60% to 95% the length (width) of the prismatic battery pack.

In a preferred example, the at least one depressed groove may have a connection opening section for connection with a charge pin for a battery cell activation process, the connection opening section being formed due to a discontinuous shape in which the at least one depressed groove is divided by a middle portion in the longitudinal direction of the prismatic battery pack, and the outer surface of the prismatic container excluding the connection opening section may be coated with an insulative material.

Generally, a lithium secondary battery goes through a formation process during manufacture of the lithium secondary battery. The formation process is a process of charging and discharging the lithium secondary battery after assembly of the lithium secondary battery to activate the lithium secondary battery. During charging of the lithium secondary battery, lithium ions discharged from a cathode of the lithium secondary battery are moved and inserted into a carbon electrode, which is used as an anode of the lithium secondary battery. At this time, a solid electrolyte interface (SEI) film is formed at the surface of the anode. In the formation process, the lithium secondary battery is repeatedly charged and discharged with constant current or constant voltage in a predetermined range. The charge pin may be used as a connection terminal to apply constant current or constant voltage for charge and discharge to the lithium secondary battery.

In a structure in which anode and cathode charge pins contact the upper and lower parts of a battery cell, respectively, therefore, the at least one depressed groove has a connection opening section for connection with a charge pin for a battery cell activation process, the connection opening section being formed due to a discontinuous shape in which the at least one depressed groove is divided by a middle portion in the longitudinal direction of the prismatic battery pack, and the outer surface of the prismatic container excluding the connection opening section is coated with an insulative material, thereby effectively performing the battery cell activation process.

The insulative material for the prismatic container is not particularly restricted so long as the insulative material is coated on the outer surface of the prismatic container to insulate the outer surface of the prismatic container from the outside. For example, the coating of the prismatic container with the insulative material may be achieved by anodizing an aluminum oxide on the outer surface of the prismatic container, by spraying the insulative material to the outer surface of the prismatic container, or by applying an insulative thin film label to the outer surface of the prismatic container.

The outer surface of the prismatic container is insulated from the outside using the above coating or application method.

According to circumstances, the connection opening section, on which the insulative material is not coated, may be sealed with an additional insulative material after the battery cell activation process is performed.

In a preferred example, the PCM may include a printed circuit board (PCB) having a protection circuit formed thereon, a connection member (A) connected to a first electrode terminal of a battery cell, and a connection member (B) connected to a second electrode terminal of the battery cell via a safety element, and the PCB may be provided with a through hole, through which the connection member (A) is exposed.

In a concrete example, the safety element may be a positive temperature coefficient (PTC) element. The PTC element may include a PTC body, a PCM coupling part coupled to a top of the PTC body, and a battery cell coupling part coupled to a bottom of the PTC body. The PCM coupling part may be coupled to the connection member (A) through the through hole of the PCB.

Preferably, one end of the connection member (B) is coupled to a bottom of the PCB in a state in which the end of the connection member (B) extends longer than an outer circumference of the PCB such that the end of the connection member (B) is exposed upward.

According to circumstances, the prismatic battery pack may further include an auxiliary mounting member having one end coupled to the bottom of the PCB and the other end coupled to the top of the battery cell is provided such that the PCB is stably mounted to the battery cell.

In accordance with another aspect of the present invention, there is provided a mobile device including the prismatic battery pack with the above-stated construction as a power source.

In a concrete example, the mobile device may be a smart phone, a smart pad, a tablet personal computer, or a laptop computer.

The structure of the mobile device including the prismatic battery pack as the power source and a method of manufacturing the same are well known in the art to which the present invention pertains, and a detailed description thereof will be omitted.

Advantageous Effects

As is apparent from the above description, in a prismatic battery pack according to the present invention, the volume of an electrode assembly is increased by the thickness in a battery pack having a predetermined size by the provision of a depressed groove. As a result, it is possible to increase the capacity of the battery pack. Also, the battery pack is easily coupled or decoupled to or from a device by the provision of the depressed groove, thereby improving manufacturing efficiency of the device.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the embodiments will be described only for a better understanding of the present invention, and therefore, the scope of the present invention is not limited by the illustrated embodiments.

Figure 1:
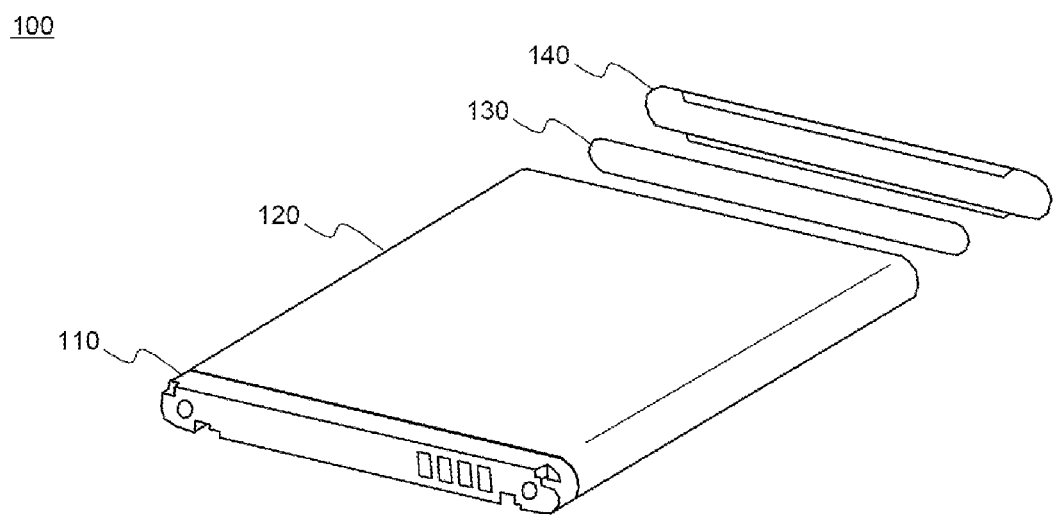
FIG. 1 is perspective view showing a conventional battery pack.
Figure 2:
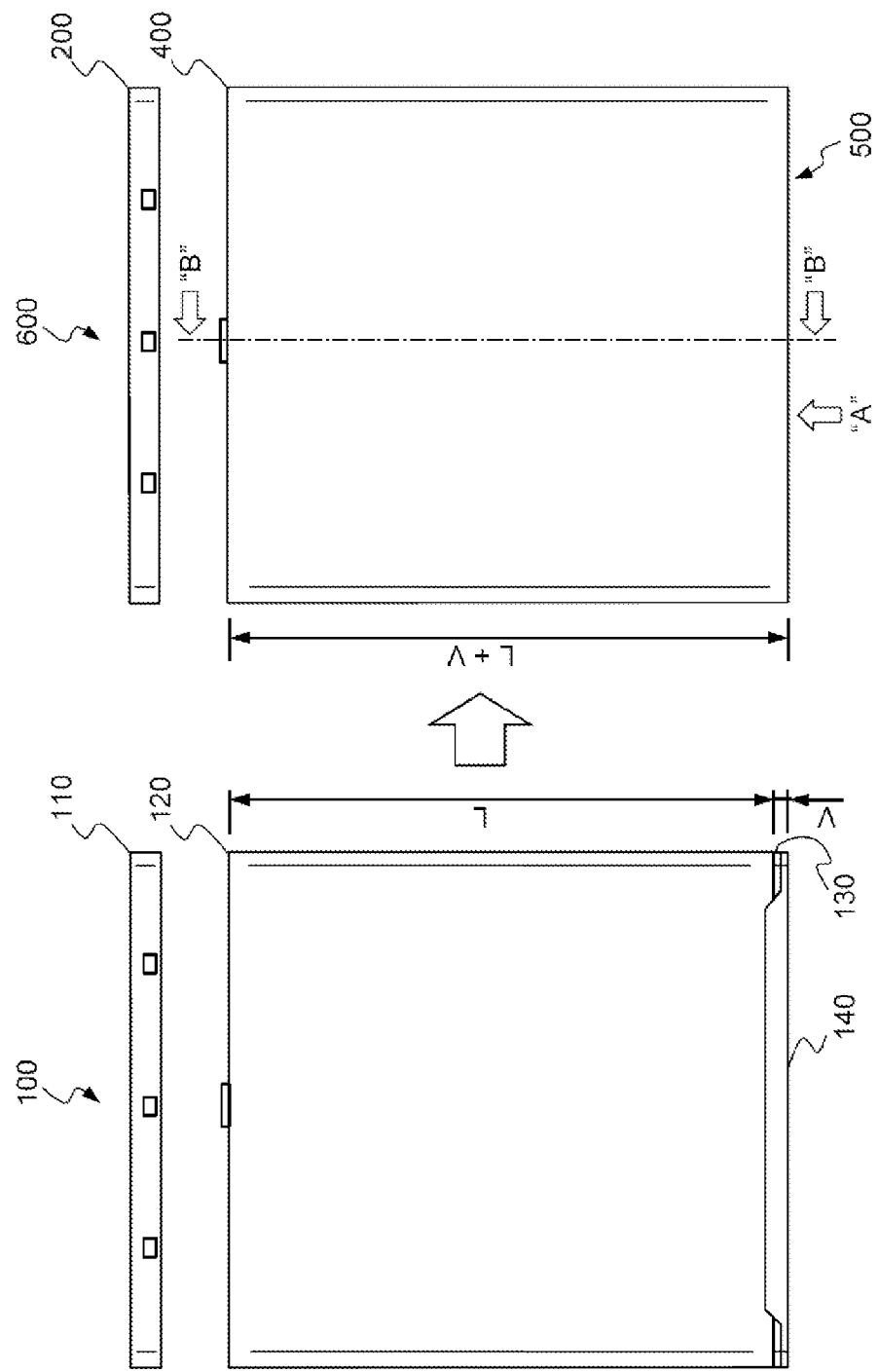
FIG. 2 is a view showing comparison between the conventional battery pack and a battery pack according to an embodiment of the present invention.

FIG. 1 is perspective view showing a conventional battery pack, FIG. 2 is a view showing comparison between the conventional battery pack and a battery pack according to an embodiment of the present invention, and FIGS. 3 to 9 are views showing the battery pack according to the embodiment of the present invention.

Referring first to FIG. 2, a prismatic battery pack 600 according to an embodiment of the present invention includes an electrode assembly (not shown), a prismatic container 400 having a depressed groove 500 formed at the bottom thereof in the longitudinal direction of the prismatic battery pack 600, and an upper assembly unit 200 including a protection circuit module (not shown).

On the other hand, a conventional prismatic battery pack 100 includes an electrode assembly (not shown), a prismatic container 120, an upper assembly unit 200 including a protection circuit module (not shown), a double-sided tape 130, and a bottom cap 140.

The prismatic battery pack 600 according to the embodiment of the present invention does not include the double-sided tape 130 and the bottom cap 140, which are components of the conventional prismatic battery pack 100, but includes the depressed groove 500 instead of the double-sided tape 130 and the bottom cap 140. Consequently, the size of the prismatic container 400 of the prismatic battery pack 600 according to the embodiment of the present invention is increased as compared with other battery packs having the same size as the prismatic battery pack 600 according to the embodiment of the present invention. As a result, the size of the electrode assembly mounted in the prismatic container 400 is also increased, thereby increasing the capacity of the prismatic battery pack 600 according to the embodiment of the present invention.

Specifically, the double-sided tape 130 and the bottom cap 140 occupying a length V of the conventional prismatic battery pack 100 are omitted from the prismatic battery pack 600 according to the embodiment of the present invention. As a result, the length of the prismatic container 400 of the prismatic battery pack 600 according to the embodiment of the present invention is increased by the length V as compared with the prismatic container 120 of the conventional prismatic battery pack 100.

Consequently, the total length of the prismatic container 400 of the prismatic battery pack 600 according to the embodiment of the present invention is increased by L+V with the result that the electrode assembly (not shown) mounted in the prismatic container 400 is increased, thereby increasing the capacity of the prismatic battery pack 600 according to the embodiment of the present invention.

Referring to FIGS. 2 to 5, the prismatic container 400 is made of an aluminum alloy. The prismatic container 400 is formed by drawing. The depressed groove 500 is formed by forging.

Figure 5:
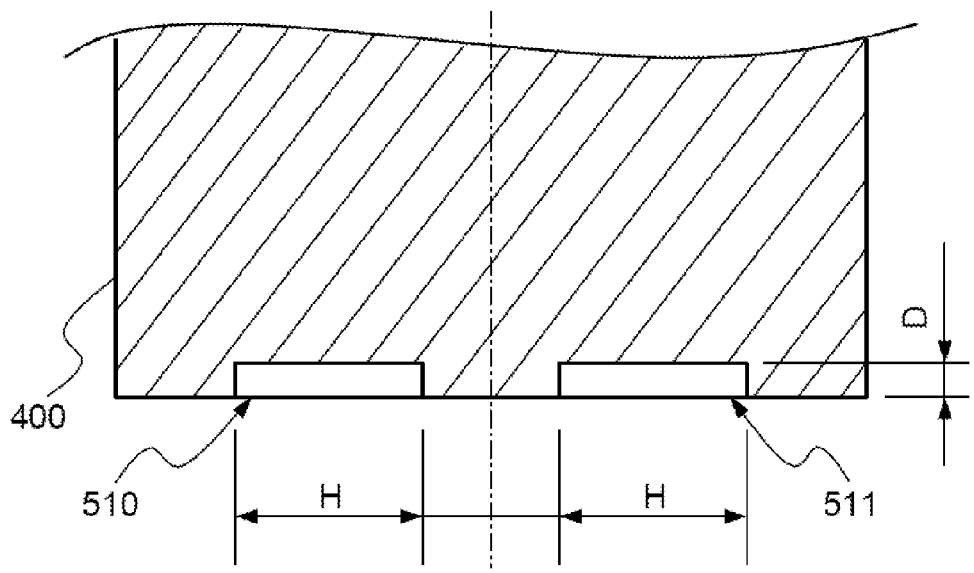
FIG. 5 is a detailed view showing a part "C" of FIG. 4.

As shown in FIG. 5, the depressed groove 500 is a portion depressed into the prismatic container 400. The depressed groove 500 has a depth of 0.05 mm to 1.00 mm. The depressed groove 500 has a width H equivalent to 10% to 50% the thickness of the prismatic battery pack 600. Also, the depressed groove 500 has a length W' equivalent to 60% to 95% the width W of the prismatic battery pack 600.

Figure 3:
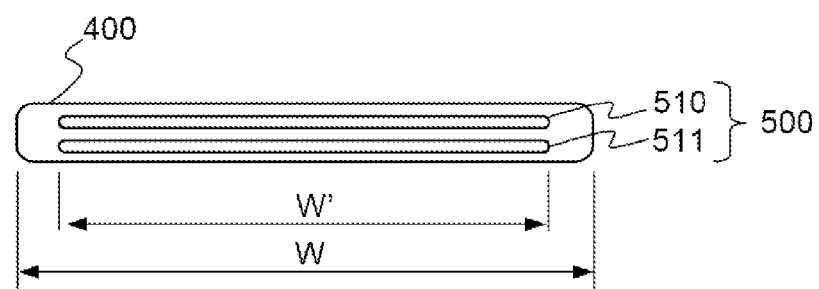
FIG. 3 is a side view of FIG. 2 in an "A" direction.
Figure 4:
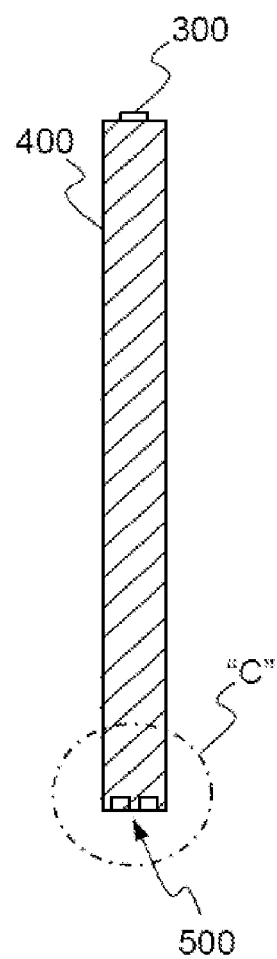
FIG. 4 is a sectional view taken along line "B"-"B" of FIG. 2.
Figure 6:
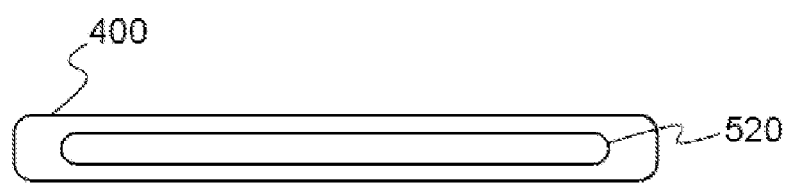
FIGS. 6 to 8 are front views showing a depressed groove according to an embodiment of the present invention.

Referring to FIGS. 3 and 6, two parallel depressed grooves 510 and 511 or one continuous groove 520 is formed at the bottom of the prismatic container 400.

Figure 7:
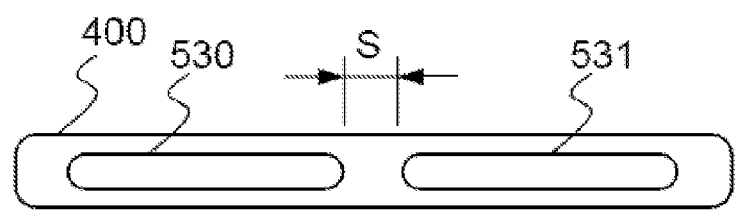
Figure 8:
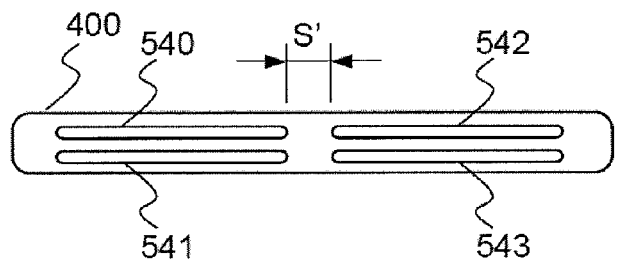

Referring to FIGS. 7 and 8, depressed grooves 530, 531, 540, 541, 542, and 543 are formed in a discontinuous shape in which the depressed grooves 530, 531, 540, 541, 542, and 543 are divided by middle portions S and S' in the longitudinal direction of the prismatic battery pack 600 as another example.

Specifically, charge pins are connected to the middle portions S and S', at which the depressed grooves 530, 531, 540, 541, 542, and 543 are not formed, during a subsequent battery cell activation process.

After the depressed groove 500 is formed in the prismatic container 400, the outer surface of the prismatic container 400 is coated with an insulative material.

Specifically, the outer surface of the prismatic container 400 may be coated with the insulative material by anodizing an aluminum oxide on the outer surface of the prismatic container 400, spraying an insulative material to the outer surface of the prismatic container 400, or applying an insulative thin film label to the outer surface of the prismatic container 400.

Meanwhile, the insulative material is coated on the outer surface of the prismatic container 400 excluding the middle portions S and S', at which the depressed grooves 530, 531, 540, 541, 542, and 543 are not formed.

The middle portions S and S', at which the depressed grooves 530, 531, 540, 541, 542, and 543 are not formed, is sealed with an insulative material after a subsequent battery cell activation process is performed.

Figure 9:
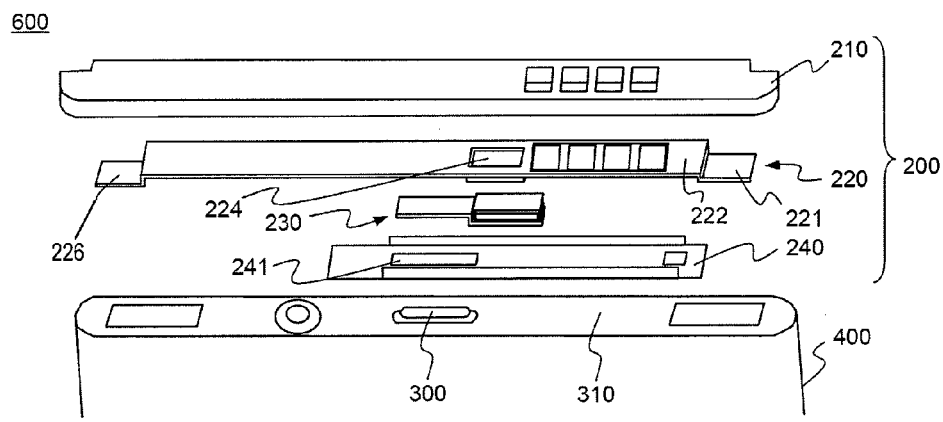
FIG. 9 is an exploded view showing the upper part of the battery pack according to the embodiment of the present invention.
Figure 10:
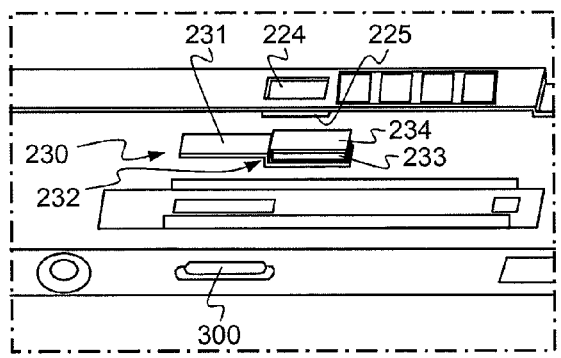
FIG. 10 is a partially enlarged view of FIG. 9.

Referring to FIGS. 9 and 10, the prismatic battery pack 600 is configured to have a structure including a prismatic container 400 including an electrode assembly (not shown), an electrically insulative mounting member 240 mounted to the top of the prismatic container 400, a protection circuit module (PCM) 220, and an insulative cap 210 mounted to the upper end of the prismatic container 400 while surrounding the electrically insulative mounting member 240.

The prismatic container 400, made of an aluminum material, is configured to have a structure in which an electrode assembly of a cathode/separator/anode structure is disposed in the prismatic container 400 in a state in which the electrode assembly is impregnated with an electrolyte, an anode terminal 300 protrudes from the middle of the top of the prismatic container 400, and a cathode terminal 310 is formed at the top of the prismatic container 400 excluding the anode terminal 300.

The electrically insulative mounting member 240 is provided with an opening 241, through which the anode terminal 300 of the prismatic container 400 is exposed.

The PCM 220 includes a printed circuit board (PCB) 222 having a protection circuit formed thereon, the PCB 222 being loaded on the electrically insulative mounting member 240, a connection member 221 connected to the cathode terminal 310, and a connection member 225 connected to the anode terminal 300 via a positive temperature coefficient (PTC) element 230.

The PCB 222 is provided with a through hole 224, through which the connection member 225 is exposed. The connection member 225 is coupled to the bottom of the through hole 224 of the PCB 222.

Referring to FIG. 10, the PTC element 230 includes a PTC body 233, a PCM coupling part 234 coupled to the top of the PTC body 233, and a battery cell coupling part 231 coupled to the bottom of the PTC body 233. The PCM coupling part 234 is coupled to the connection member 225 through the through hole 244 of the PCB 222.

Also, the battery cell coupling part 231 includes a step 232 having a height equal to the height of the PTC body 233 or the sum of the height of the PTC body 233 and the height of the PCM coupling part 234. Although the PTC element 230 is mounted to the prismatic container 400, therefore, the increase in height of the upper assembly unit 200 of the prismatic battery pack 600 is maximally restrained by virtue of the battery cell coupling part 231 including the step 232.

Meanwhile, one end of the connection member 221 is coupled to the bottom of the PCB 222 by surface mount technology (SMT) in a state in which the end of the connection member 221 extends longer than the outer circumference of the PCB 222 such that the end of the connection member 221 is exposed upward.

An auxiliary mounting member 226, formed of a nickel plate, having one end coupled to the bottom of the PCB 222 and the other end coupled to the top of the prismatic container 400 is provided such that the PCB 222 can be stably mounted to the prismatic container 400. The auxiliary mounting member 226 is coupled to a position opposite to the connection member 221.

The insulative cap 210 is made of an electrically insulative material. The insulative cap 210 is formed to surround the electrically insulative mounting member 240 in a state in which the connection members 221 and 225 and the printed circuit board 222 are loaded on the insulative cap 210.

Also, the insulative cap 210 is coupled to the top of the prismatic container 400 by bonding.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A prismatic battery pack comprising:
an electrode assembly of a cathode/separator/anode structure impregnated with an electrolyte;
a prismatic container, in which the electrode assembly is mounted, the prismatic container having at least one depressed groove formed at a bottom thereof in a longitudinal direction of the prismatic battery pack;
a cap plate coupled to an open upper end of the prismatic container, in which the electrode assembly is mounted;
a protection circuit module (PCM) comprising a protection circuit to control operation of the prismatic battery pack, the PCM being loaded on the cap plate; and
an insulative cap mounted to the prismatic container while surrounding the PCM,
wherein the at least one depressed groove has a connection opening section for connection with a charge pin for a battery cell activation process, the connection opening section being formed due to a discontinuous shape in which the at least one depressed groove is divided by a middle portion in the longitudinal direction of the prismatic battery pack,
wherein an outer surface of the prismatic container excluding the connection opening section is coated with an insulative material,
wherein the coating of the prismatic container with the insulative material is achieved by anodizing an aluminum oxide on the outer surface of the prismatic container or by spraying the insulative material to the outer surface of the prismatic container.

2. The prismatic battery pack according to claim 1, wherein the prismatic container is made of aluminum or an aluminum alloy.

3. The prismatic battery pack according to claim 1, wherein the prismatic container is formed by drawing.

4. The prismatic battery pack according to claim 3, wherein the drawing is any one selected from a group consisting of deep drawing, square shell drawing, reverse redrawing, asymmetric drawing, expanding forming drawing, restriking drawing, necking drawing, expanding drawing, flaring drawing, and bell mouth drawing.

5. The prismatic battery pack according to claim 1, wherein the at least one depressed groove is formed by forging or milling.

6. The prismatic battery pack according to claim 1, wherein the at least one depressed groove has a depth of 0.05 mm to 1.00 mm.

7. The prismatic battery pack according to claim 1, wherein the at least one depressed groove has a width equivalent to 10% to 50% a width of the prismatic battery pack.

8. The prismatic battery pack according to claim 1, wherein the at least one depressed groove comprises two parallel depressed grooves formed at the bottom of the prismatic container, each groove being formed due to a discontinuous shape in which the at least one depressed groove is divided by a middle portion in the longitudinal direction of the prismatic battery pack.

9. The prismatic battery pack according to claim 8, wherein each of the depressed grooves has a length equivalent to 60% to 95% a length of the prismatic battery pack.

10. The prismatic battery pack according to claim 1, wherein the PCM comprises a printed circuit board (PCB) having a protection circuit formed thereon, a first connection member connected to a first electrode terminal of a battery cell, and a second connection member connected to a second electrode terminal of the battery cell via a safety element, and
the PCB is provided with a through hole, through which the second connection member is exposed.

11. The prismatic battery pack according to claim 10, wherein the safety element is a positive temperature coefficient (PTC) element, the PTC element comprising a PTC body, a PCM coupling part coupled to a top of the PTC body, and a battery cell coupling part coupled to a bottom of the PTC body, the PCM coupling part being coupled to the second connection member through the through hole of the PCB.

12. The prismatic battery pack according to claim 10, wherein one end of the first connection member is coupled to a bottom of the PCB in a state in which the end of the first connection member extends longer than an outer circumference of the PCB such that the end of the first connection member is exposed upward.

13. The prismatic battery pack according to claim 10, further comprising an auxiliary mounting member having one end coupled to a bottom of the PCB and the other end coupled to a top of the battery cell is provided such that the PCB is stably mounted to the battery cell.

14. A mobile device comprising a prismatic battery pack according to claim 1 as a power source.

15. The mobile device according to claim 14, wherein the mobile device is a smart phone, a smart pad, a tablet personal computer, or a laptop computer.

\* \* \* \* \*